United States Patent [19]

Stuhler

[11] Patent Number: 4,993,997
[45] Date of Patent: Feb. 19, 1991

[54] LUGGED BELT DRIVEN LINEAR X-Y POSITIONER

[76] Inventor: William B. Stuhler, 1908 Edgewater, Plano, Tex. 75075

[21] Appl. No.: 490,347

[22] Filed: Mar. 8, 1990

[51] Int. Cl.$^5$ ............................. F16H 1/00; F16H 7/00
[52] U.S. Cl. ...................................... 474/165; 474/86; 474/101
[58] Field of Search ............... 474/165, 150, 84–89, 474/101; 254/202, 203, 205, 241

[56] References Cited

U.S. PATENT DOCUMENTS

| | | | |
|---|---|---|---|
| 3,605,977 | 9/1971 | Janz et al. | 474/86 X |
| 4,259,810 | 4/1981 | West | 474/86 X |
| 4,507,102 | 3/1985 | Geis et al. | 474/101 |
| 4,708,695 | 11/1987 | Sugiyama | 474/101 |

Primary Examiner—Thuy M. Bui
Attorney, Agent, or Firm—Warren H. Kintzinger

[57] ABSTRACT

A two axis drive lugged belt and lugged pulley drive system driving a driven member independently in two, mutually perpendicular areas with the drive in each direction operational alone or simultaneously for vector movement of the driven member. Both X-Y axis are directly belt-driven by respective motors and with the axis considered "Y" the primary hysteresis minimizing drive is directed primarily to the lugged belt of substantial length in the "Y" axis. This is with the "Y" drive lugged belt routed around six pulleys to move the "X" axis carriage mounting and guide structure, with the belt attached at two points, at opposite sides of one end of the "X" axis carriage mounting and guide structure. The drive motor for the "Y" drive lugged belt is directly coupled to one of the six pulleys that is gear meshed to another of the six pulleys assuring precise synchronous counter-rotation of the paired set of pulleys at one corner of the "Y" drive. There is a second set of gear meshed pulleys at an "X" direction displaced corner from the corner set of motor driven pulleys. One side of one dual leg of the drive lugged belt is twisted and opposite end belt connections are reversed for proper belt lug engagement with the lugged pulleys of each set pair of gear meshed pulleys. The lugged belt is attached to opposite ends of the "X" axis carriage with the opposite ends of the belt in close adjacency at one end of the "X" axis carriage and with the inside section of a belt loop segment clipped to the other end of the "X" axis carriage.

17 Claims, 2 Drawing Sheets

LUGGED BELT DRIVEN LINEAR X-Y POSITIONER

BACKGROUND OF THE INVENTION

This invention relates in general to belt driven X-Y component positioning systems, and more particularly, to a lugged belt and lugged pulley driven linear X-Y positioner.

Many machines have systems for linear positioning of work pieces and various other articles to perform work such as assembly, testing, packaging, palletizing, welding, bonding, dispensing, etc. Most linear positioning used today requires at least some form of remote control permitting the rate of movement, accelerations and positioning accuracy to be remotely controlled and predictable. The technology of many linear positioning systems is quite old such as shown with many examples including milling machines and other machine tools. Machines such as these use heavy, precision made components to provide a means to drive and guide an object in a straight line and motor driven screws power driving objects in their movements. Many new drive components that have become available in recent years provide many design opportunities for drive system improvements. Stepping motors, for example, are now available with positioning capabilities as high as twenty five thousand steps per revolution of the motor output shaft to thereby permit linear drive systems a greater range of drive design considerations in more direct methods of power conversion (as opposed to conventional lead screws and/or gear drives) while maintaining considerable resolution. Another advantage with more direct drives is that they permit the motor drive to operate at a lower frequency providing higher linear positioning speeds and reduced noise levels. One direct drive approach is the use of a timing belt driven directly by a timing belt pulley attached to the motor shaft. Heretofore, the disadvantage of such a drive is that if the timing belt becomes very long the elasticity thereof causes some hysteresis in the drive system directly reducing positioning accuracy. It should be noted that with a timing belt drive (i.e. lugged belt and pulley drive) that hysteresis error is directly related to the linear force required to move the load and the length of the timing belt.

It is therefore a principal object of this invention to provide a lugged belt and pulley drive with high positioning accuracy.

Another object with such a lugged belt drive is to minimize hysteresis and the effect of hysteresis in the drive system.

A further object is to provide such belt drive improvements in a lugged belt driven positioning X-Y positioning system.

Still another object is to provide such a lugged belt driven X-Y positioning drive divided into three sectors having high positioning accuracy in a relatively low cost drive system.

Features of the invention useful in accomplishing the above objects include, in a lugged belt and pulley X-Y article positioned drive system, a two axis drive lugged belt and lugged pulley drive system driving a driven member independently in two, mutually perpendicular axes with the drive in each direction operational alone or simultaneously for vector movement of the driven member. Both X-Y axis are directly belt-driven by respective motors and with the axis considered "Y" the primary hysteresis minimizing drive is directed primarily to the lugged belt of substantial length in the "Y" axis. This is with the "Y" drive lugged belt routed around six pulleys to move the "X" axis carriage mounting and guide structure, with the belt attached at two points, at opposite sides of one end of the "X" axis carriage mounting and guide structure. The drive motor for the "Y" drive lugged belt is directly coupled to one of the six pulleys that is gear meshed to another of the six pulleys assuring precise synchronous counter-rotation of the paired set of pulleys at one corner of the "Y" drive. There is a second set of gear meshed pulleys at an "X" direction displaced corner from the corner set of motor driven pulleys. One side of one dual leg of the drive lugged belt is twisted and opposite end belt connections are reversed for proper belt lug engagement with the lugged pulleys of each set pair of gear meshed pulleys. The lugged belt is attached to opposite ends of the "X" axis carriage with the opposite ends of the belt in close adjacency at one end of the "X" axis carriage and with the inside section of a belt loop segment clipped to the other end of the "X" axis carriage. In this drive system a driven member is moved independently in two mutually perpendicular axes that are directly belt driven by their respective motors with this specification directed primarily to the design of the "Y" axis drive that uses a lugged belt of substantial length. The effect of hysteresis (or backlash) is substantially reduced in this drive system with four precision spur gears attached to four rear lugged pulley drive shafts with each meshed set assuming precise synchronous counter-rotation of each set, This forces the lugged belt to remain synchronous within each belt sector minimizing the effect of belt stretch by dividing the "Y" axis lugged drive belt into effectively three independent sections.

A specific embodiment representing what is presently regarded as the best mode of carrying out the invention is illustrated in the accompanying drawings.

DESCRIPTION OF THE PREFERRED EMBODIMENT

Figure 1:
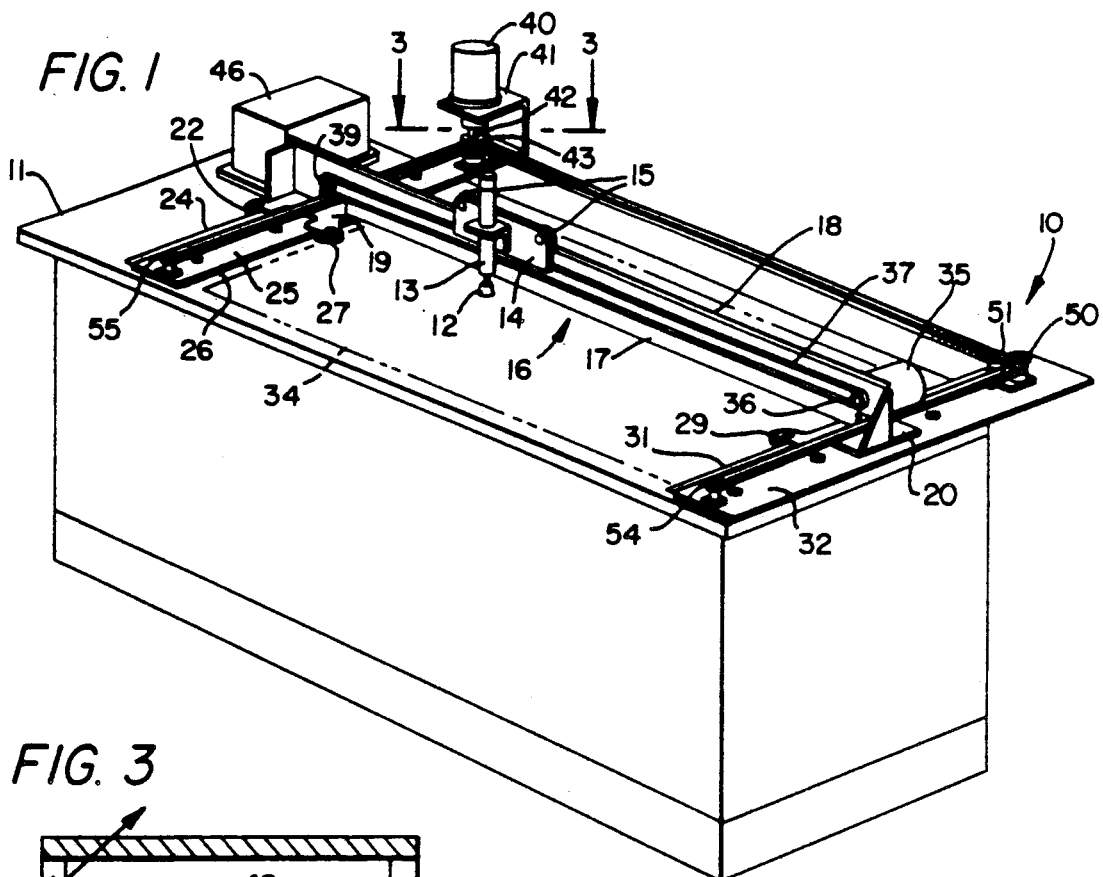
FIG. 1 represents a perspective view of a lugged belt and pulley driven X-Y positioner with an article suction pick up element mounted over a table supporting work pieces subject to being lifted and positioned.
Figure 3:
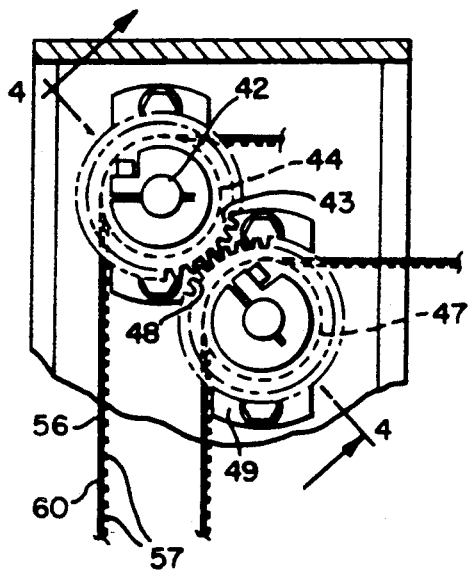
FIG. 3, a partially cut away and sectioned view, taken along line 3—3 of FIG. 1, of a meshed gear interconnected pair of lugged pulleys driving a "Y" drive lugged belt.
Figure 4:
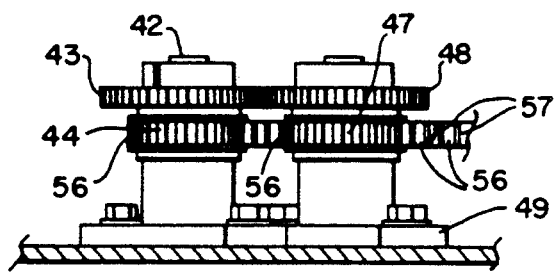
FIG. 4 a partially cut away and sectioned view, along line 4—4 of FIG. 3, showing more detail of the meshed gears, lugged pulleys and drive lugged belt of FIG. 3.
Figure 2:
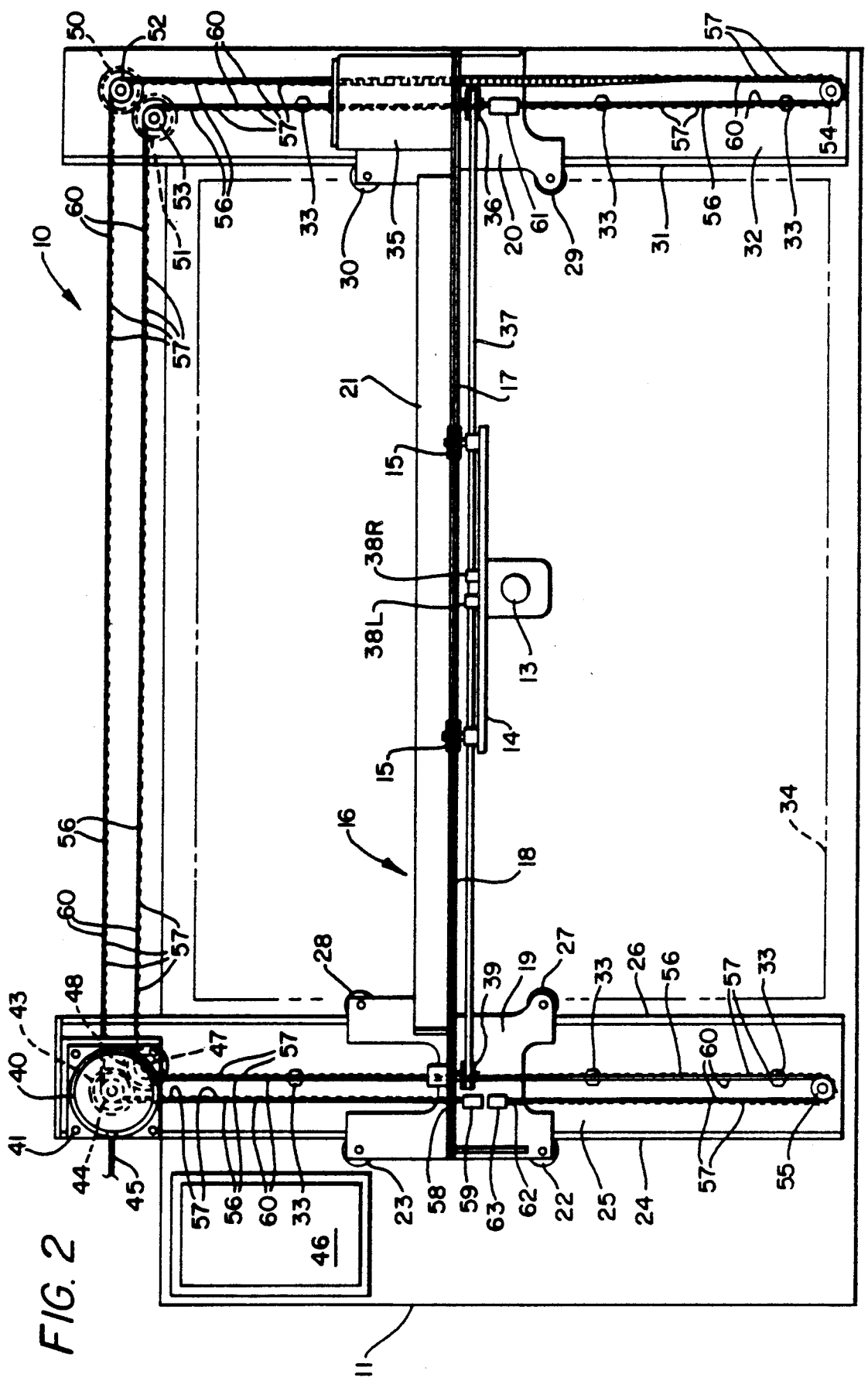
FIG. 2, a top plan view of the lugged belt and pulley driven X-Y positioner of FIG. 1.

A lugged belt driven X-Y positioner structure 10 is shown in FIGS. 1 and 2 to be mounted on and above a work table 11 (or bin) that supports or holds work piece articles that are subject to being picked up and repositioned by suction probe 12. The probe 12 is moved up and down by power cylinder 13 mounted on "X" direction moveable carriage 14 mounted by grooved wheels 15, and a wheel (not shown) under the carriage 14, on "X" axis carriage mounting and guide structure 16 guide rail member 17 with a pointed rail surfaced upper edge 18. The guide rail member 17 extends transversely across the X-Y positioning structure 10 from a mounting carriage 19 on the left as seen in FIGS. 1 and 2 to a mounting carriage 20 on the right which are also interconnected by frame member 21 of the "X" axis carriage mounting and guide structure 16. The mounting carriage 19 on the left has opposite end "V" grooved guide rollers 22 and 23 on its left side that mate with and roll along peaked guide edge rail 24 of X-Y positioner structure mount and rail guide member 25 having a peaked inner guide rail edge 26 along which "V" grooved guide rollers 27 and 28 of carriage 19 roll. The right side mounting carriage 20 has opposite end "V" grooved guide rollers 29 and 30 that roll along inner peaked guide edge rail 31 of X-Y positioner structure mount and rail guide member 32. The X-Y positioner structure mount and rail guide members 25 and 32 are mounted on the work table 11 by bolts 33 with the suction probe 12 positionable through a field of operation bounded by the dashed line 34. A drive motor 35 mounted on mounting carriage 20 has a drive pulley 36 that drives belt 37 having opposite ends fastened to "X" direction moveable carriage 14 by bracket fasteners 38L and 38R and the belt 37 is looped around idler pulley 39 rotatably mounted on the left end of mounting carriage 19.

A "Y" movement drive motor 40 is mounted on flange mount 41 on and above the rear end of mount and rail guide member 25 with a depending drive shaft 42 extended to and through, and drive connected to, precision gear 43 and there beneath lugged pulley 44 to be driven as directed through line 45 from computer control box 46. Computer control box 46 also provides control for "X" direction drive motor 35 and also for probe power cylinder 13 and air suction control to the suction probe 12 (connection detail not shown). An additional lugged pulley 47 in close adjacency to lugged pulley 44 is provided along with a precision gear 48 both drive connected together rotationally mounted by mount structure 49 with the precision driven engagement with precision gear 43. A pair of precision meshed gears 50 and 51 are rotatably mounted on and above the rear end of mount and rail guide member 32 along with lugged pulleys 52 and 53 fixed to gears 50 and 51, respectively, for rotation therewith. An idler pulley 54 is rotatably mounted on and above the forward end of mount and rail guide member 32, and an idler pulley 55 is rotationally mounted on and above the forward end of mount and rail guide member 25. A two ended lugged belt 56 of substantial length with lugs 57 on one side thereof is used for the "Y" direction drive of the lugged belt driven linear X-Y positioner. End 58 of lugged belt 56 is fastened by bracket fastener 59 to mounting carriage 19 with the belt lugs 57 facing inwardly. The lugged belt 56 extends to and is passed around lugged pulley 44 with belt lugs 57 engaging and driven by the lugged pulley 44, the belt 56 is then passed over lugged pulley 52 with the belt lugs engaging and driving the lugged pulley 52. The lugged belt 56 is then twisted through one hundred eighty degrees in the length thereof between lugged pulley 52 and idler pulley 54 so that the back side 60 of lugged belt 56 engages pulley 54 as it passes thereover. The lugged belt 56 is then passed to and over and in lugged engagement with lugged pulley 53 with, however, it being fixed therebetween to mounting carriage 20 by clamp 61. The belt 56 extends from lugged pulley 53 to and over lugged pulley 47 in lugged engagement therewith, and then down and around idler pulley 55 with the back side 60 of the belt 56 engaging the idler pulley 55. The belt 56 then extends to end 62 thereof fastened by bracket fastener 63 to mounting carriage 19 with lugs 57 on this portion of the belt 56 facing outwardly toward the left. The effect of hysteresis (or backlash) is substantially reduced in this drive system with four precision spur gears attached to the four rear lugged pulley shafts with each meshed set of gears assuming precise synchronous counter-rotation of each gear set and thereby like synchronous counter-rotation of each lugged pulley set. This in turn forces the lugged belt to remain essentially synchronous within each belt sector minimizing the effect of belt stretch with, in effect, dividing the "Y" axis lugged drive belt into three substantially independent sections.

It should be noted that the rail guide members 25 and 32 could be vertically thicker and be joined by front and back frame members (not shown) to provide an independent lugged belt driven X-Y positioner structure preassembled for installation as desired. Further, a belt with lugs on both sides could be used in place of belt 56 in which case the belt would not have to be twisted at all in the "Y" drive system.

Whereas this invention has been described with respect to a single embodiment thereof, it should be realized that various changes may be made without departure from the essential contributions to the art made by the teachings hereof.

I claim:

1. A lugged belt driven linear positioner comprising: a transversally extended carriage structure extended from a first rail means mounted carriage member to a second rail means mounted carriage member with both movable in unison in the transversally extended carriage through a range of movement back and forth along said first and second rail means; space maintaining means holding said first and second rail means in spaced parallel relation; lugged belt drive means positioned in the positioner structure and connected to each of said first and second rail means mounted carriage members; said lugged belt drive means including four lugged pulleys rotatably mounted in pairs, a first pair at a first end of said first rail means, and a second pair at a first end of said second rail means, four gears each drive connected to one of said four lugged pulleys with the two gears with each pair of lugged pulleys in meshed engagement, a first idler pulley rotatably mounted at a second end of said second rail means and a second idler pulley rotatably mounted at a second end of said first rail means, power drive input means drive shaft connected to one of said four gears and to one of said four lugged pulleys; and a lugged belt extended from connection means fastening to said first rail means mounted carriage means to and passed over a first lugged pulley at the first end of said first rail means with belt lugs engaging and driven by the first lugged pulley, the belt then extended to and passed over a second lugged pulley with belt lugs engaging and driving lugs of said second lugged pulley rotatably mounted at a first end of said second rail means; the belt then extended to and around said first idler pulley rotatably mounted at a second end of said second rail means, extension of the belt from said first idler pulley to and over in lugged engagement with a third lugged pulley paired with said second lugged pulley, extension of the lugged belt from said third lugged pulley to and over a fourth lugged pulley in lugged engagement therewith and then down and around said second idler pulley and back to a connection means fastening to said first rail means mounted carriage means.

2. The lugged belt driven linear positioner of claim 1, wherein said lugged belt is a one sided lugged belt twisted one hundred eighty degrees in the extent thereof between said second lugged pulley and said third lugged pulley; and said one side lugged belt is changed in orientation one hundred eighty degrees in the extent thereof between said fourth lugged pulley and said first lugged pulley.

3. The lugged belt driven linear positioner of claim 2, wherein said lugged belt is twisted one hundred and eighty degrees between said second lugged pulley and said first idler pulley; and said lugged belt is a two ended belt with a first end connection one hundred and eighty degrees reversed from a second end connection with said first rail means mounted carriage member.

4. The lugged belt driven linear positioner of claim 3, wherein with four spur gears each attached to four lugged pulley mounting shafts with two of the spur gears of each pair of lugged pulley mounting shafts being precision meshed spur gears the lugged drive belt is divided effectively into three independent sections with precise synchronous counter rotation of each meshed gear set and thereby like synchronous counter rotation of each lugged pulley set dividing the sections one from the other; one section being the lugged belt section extended between lugged pulley sets; and two opposite end lugged belt sections extended from respective lugged pulley sets to respective idler pulleys.

5. The lugged belt driven linear positioner of claim 4, wherein said two opposite end lugged belt sections are in spaced parallel relation coplanar with said lugged belt section extended between lugged pulley sets and extended at right angles thereto.

6. The lugged belt driven linear positioner of claim 5, wherein said power drive input means is a drive motor mounted above one of said four gears drive connected to respective individual pulleys of said four lugged pulleys.

7. The lugged belt driven linear positioner of claim 5, wherein said transversally extended carriage structure includes guide rail means extended therealong; an implement carrying structure carrying a rail carriage mounted on and movable along said guide rail means; an idler belt pulley rotatably mounted on said first rail means mounted carriage member; a drive pulley mounted on said second rail means mounted carriage member; a pulley belt looped around said idler belt pulley and said drive pulley and connected to said implement carrying structure; and second power drive input means mounted on said second rail means mounted carriage member drive connected to said drive pulley.

8. The lugged belt driven linear positioner of claim 7, wherein said second power drive input means is a drive motor mounted above said second rail means mounted carriage member.

9. The lugged belt driven linear positioner of claim 7, wherein said implement is a power cylinder raised and lowered suction probe.

10. The belt driven linear positioner of claim 7, wherein said positioner is an X-Y positioner with the Y positioning drive being said three sectioned lugged belt drive.

11. The lugged belt driven linear positioner of claim 1, wherein with four spur gears each attached to four lugged pulley mounting shafts with two of the spur gears of each pair of lugged pulley mounting shafts being precision meshed spur gears the lugged drive belt is divided effectively into three independent sections with precise synchronous counter rotation of each meshed gear set and thereby like synchronous counter rotation of each lugged pulley set dividing the sections one from the other; one section being the lugged belt section extended between lugged pulley sets; and two opposite end lugged belt sections extended from respective lugged pulley sets to respective idler pulleys.

12. The lugged belt driven linear positioner of claim 11, wherein said two opposite end lugged belt sections are in spaced parallel relation coplanar with said lugged belt section extended between lugged pulley sets and extended at right angles thereto.

13. The lugged belt driven linear positioner of claim 12, wherein said power drive input means is a drive motor mounted above one of said four gears drive connected to respective individual pulleys of said four lugged pulleys.

14. The lugged belt driven linear positioner of claim 12, wherein said transversally extended carriage structure includes guide rail means extended therealong; an implement carrying structure carrying a rail carriage mounted on and movable along said guide rail means; an idler belt pulley rotatably mounted on said first rail means mounted carriage member; a drive pulley mounted on said second rail means mounted carriage member; a pulley belt looped around said idler belt pulley and said drive pulley and connected to said implement carrying structure; and second power drive input means mounted on said second rail means mounted carriage member drive connected to said drive pulley.

15. The lugged belt driven linear positioner of claim 14, wherein said second power drive input means is a drive motor mounted above said second rail means mounted carriage member.

16. The lugged belt driven linear positioner of claim 14, wherein said implement is a power cylinder raised and lowered suction probe.

17. The lugged belt driven linear positioner of claim 14, wherein said positioner is an X-Y positioner with the Y positioning drive being said three sectioned lugged belt drive.

* * * * *